(12) United States Patent
Bickham et al.

(10) Patent No.: US 11,327,242 B2
(45) Date of Patent: May 10, 2022

(54) OPTICAL FIBER CONNECTOR ASSEMBLY WITH FERRULE MICROHOLE INTERFERENCE FIT AND RELATED METHODS

(71) Applicant: CORNING RESEARCH & DEVELOPMENT CORPORATION, Corning, NY (US)

(72) Inventors: Scott Robertson Bickham, Corning, NY (US); Mark Alan McDermott, Prattsburgh, NY (US); Pushkar Tandon, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/097,210

(22) Filed: Nov. 13, 2020

(65) Prior Publication Data
US 2021/0157062 A1 May 27, 2021

Related U.S. Application Data

(60) Provisional application No. 62/941,432, filed on Nov. 27, 2019.

(51) Int. Cl.
*G02B 6/02* (2006.01)
*G02B 6/255* (2006.01)
(Continued)

(52) U.S. Cl.
CPC ....... *G02B 6/3834* (2013.01); *G02B 6/02033* (2013.01); *G02B 6/255* (2013.01);
(Continued)

(58) Field of Classification Search
CPC .. G02B 6/02033; G02B 6/255; G02B 6/3834; G02B 6/3854; G02B 6/3861;
(Continued)

(56) References Cited

U.S. PATENT DOCUMENTS 5,318,613 A 6/1994 Amos et al.
5,862,280 A * 1/1999 Tanaka ................ G02B 6/3837
385/78
(Continued)

FOREIGN PATENT DOCUMENTS

EP 0443112 A1 8/1991
EP 0574704 A2 12/1993
(Continued)

OTHER PUBLICATIONS

Steenberge et al., "Laser Cleaving of Glass Fibers and Glass Fiber Arrays", Journal of Lightwave Technology, vol. 23, No. 2, Feb. 2005, 6 pages.
(Continued)

*Primary Examiner* — Ryan A Lepisto
(74) *Attorney, Agent, or Firm* — Kapil U. Banakar

(57) ABSTRACT

The present disclosure relates to a process by which an optical fiber is terminated with a ferrule to form an optical fiber connector assembly. The ferrule is heated at a heating temperature whereby the ferrule bore (and ferrule microhole) expands. The optical fiber is then inserted into the ferrule microhole. The ferrule then contracts when heat is no longer applied resulting in an interference fit between the optical fiber and the ferrule microhole based on the dimensions of the optical fiber and the ferrule microhole. The interference fit yields certain optical fiber characteristics within the optical fiber connector assembly. The present disclosure also relates to an optical fiber having an outer cladding comprising titania-doped silica and the resulting optical fiber characteristics.

21 Claims, 14 Drawing Sheets

(51) Int. Cl.
*G02B 6/38* (2006.01)
*G02B 6/42* (2006.01)
*G02B 6/036* (2006.01)

(52) U.S. Cl.
CPC ......... G02B 6/3854 (2013.01); G02B 6/3855 (2013.01); G02B 6/3861 (2013.01); *G02B 6/03694* (2013.01); *G02B 6/3858* (2013.01); *G02B 6/4239* (2013.01)

(58) Field of Classification Search
CPC .............. G02B 6/4239; G02B 6/03694; G02B 6/3855; G02B 6/3858
See application file for complete search history.

(56) References Cited

U.S. PATENT DOCUMENTS

| | | | | |
|---|---|---|---|---|
| 6,877,910 | B2* | 4/2005 | Takahashi | B29C 45/16 385/60 |
| 6,883,976 | B2* | 4/2005 | Sato | G02B 6/3837 385/78 |
| 7,341,383 | B2* | 3/2008 | Droege | G02B 6/3834 385/78 |
| 7,435,012 | B1* | 10/2008 | Beldycki | G02B 6/3855 385/78 |
| 7,876,495 | B1 | 1/2011 | Minelly | |
| 8,488,932 | B2* | 7/2013 | Bennett | C03B 37/027 385/128 |
| 8,696,215 | B1 | 4/2014 | Fewkes et al. | |
| 8,702,322 | B1* | 4/2014 | Danley | G02B 6/3861 385/80 |
| 8,764,314 | B2 | 7/2014 | Danley et al. | |
| 9,016,953 | B2* | 4/2015 | Ott | G02B 6/381 385/60 |
| 9,151,895 | B2* | 10/2015 | Miller | G02B 6/245 |
| 9,195,006 | B1* | 11/2015 | Hoener | G02B 6/241 |
| 9,568,686 | B2 | 2/2017 | Fewkes et al. | |
| 9,791,637 | B2* | 10/2017 | Danley | G02B 6/3861 |
| 9,791,657 | B2* | 10/2017 | Chien | G02B 6/245 |
| 9,829,633 | B2 | 11/2017 | Mcdonald et al. | |
| 10,295,747 | B2 | 5/2019 | Gregorski | |
| 10,451,814 | B2* | 10/2019 | Baca | G02B 6/3861 |
| 2002/0186934 | A1* | 12/2002 | Hug | G02B 6/4292 385/80 |
| 2005/0196104 | A1* | 9/2005 | Liu | G02B 6/3857 385/78 |
| 2011/0300367 | A1 | 12/2011 | Chien | |
| 2013/0126493 | A1 | 5/2013 | Bedell et al. | |
| 2013/0343709 | A1* | 12/2013 | Danley | B23P 11/025 385/81 |
| 2016/0070064 | A1 | 3/2016 | Klimowych | |
| 2018/0120503 | A1 | 5/2018 | Bennett et al. | |
| 2019/0101702 | A1 | 4/2019 | Li et al. | |
| 2019/0227235 | A1 | 7/2019 | Zheng et al. | |

FOREIGN PATENT DOCUMENTS

| | | |
|---|---|---|
| EP | 1073921 A1 | 2/2001 |
| EP | 2864828 A1 | 4/2015 |
| WO | 98/26317 A1 | 6/1998 |
| WO | 99/54767 A1 | 10/1999 |
| WO | 2004/003612 A1 | 1/2004 |
| WO | 2013/192122 A1 | 12/2013 |

OTHER PUBLICATIONS

Wallace, "Fiber Lasers: In some cases, cleaving rather than polishing laser-gain fibers does the trick", Available at: https://www.laserfocusworld.com/lasers-sources/article/14039682/in-some-cases-cleaving-rather-than-polishing-asergain-fibers-does-the-trick, 2019, 7 pages.
Plotnichenko et al., "Influence of Molecular Hydrogen Diffusion on Concentration and Distribution of Hydroxyl Groups in Silica Fibers", Journal of Lightwave Technology, IEEE, vol. 23, No. 1, 2005, pp. 341-347.

\* cited by examiner

OPTICAL FIBER CONNECTOR ASSEMBLY WITH FERRULE MICROHOLE INTERFERENCE FIT AND RELATED METHODS

PRIORITY APPLICATION

This application claims the benefit of priority of U.S. Provisional Application No. 62/941,432, filed on Nov. 27, 2019, the content of which is relied upon and incorporated herein by reference in its entirety.

FIELD OF THE DISCLOSURE

This disclosure relates generally to optical fiber processing with a ferrule, and more particularly, to optical fiber processing that results in an optical fiber having an interference fit with a ferrule microhole and the corresponding optical fiber connector assemblies.

BACKGROUND OF THE DISCLOSURE

Optical fibers are commonly used for voice, video, and data transmissions in many different settings each of which can pose installation challenges. In a telecommunications system that uses optical fibers, there are typically many locations where fiber optic cables carrying the optical fibers connect to equipment or other fiber optic cables. To conveniently provide these connections, optical fiber connectors ("connectors") are often provided on the ends of fiber optic cables.

Optical fiber connectors typically include a ferrule with one or more bores that receive one or more optical fibers. A housing/body that surrounds at least a portion of the ferrule defines features for mechanically retaining the connector with another component (e.g. an adapter), which may include features for aligning the ferrule with a mating ferrule (e.g., from another connector). Thus, when the housing of the connector is mated with the other component, the optical fiber(s) in the ferrule can be held in alignment with the optical fiber(s) of the mating ferrule to establish an optical connection.

At interconnections between optical fiber connectors, light exiting each optical fiber of a first connector (of a first fiber optic cable) is introduced into a corresponding optical fiber within an adjacent, second connector (of a second fiber optic cable). There can be various sources of signal loss at such interconnections. The loss associated with the insertion of a connector in a given optical link is referred to as insertion loss.

There are different performance requirements for connectors based on insertion loss of randomly mated connectors. The attenuation Grade assigned to a connector is based on the mean attenuation and a maximum attenuation for 97% of the samples tested. The connector Grades range from higher quality Grade A (lowest insertion loss) to lower quality Grade D (highest insertion loss).

One aspect that affects the insertion loss between connectors is the alignment precision of the connecting fiber cores. Lateral, axial, and angular misalignment between the connecting fiber cores can increase insertion loss. Proper alignment of the fiber cores with a center of a ferrule microhole can minimize misalignment between connecting fiber cores when the connectors are mated thereby, improving insertion loss between the connectors. Improvements in the foregoing are desired.

SUMMARY OF THE DISCLOSURE

The present disclosure relates to a process by which an optical fiber is terminated with a ferrule to form an optical fiber connector assembly. The ferrule is heated at a heating temperature whereby the ferrule bore (and ferrule microhole) expands. The optical fiber is then inserted into the ferrule microhole. The ferrule then contracts when heat is no longer applied resulting in an interference fit between the optical fiber and the ferrule microhole based on the dimensions of the optical fiber and the ferrule microhole. The interference fit yields certain optical fiber characteristics within the optical fiber connector assembly. The present disclosure also relates to an optical fiber having an outer cladding comprising titania doped silica and the resulting optical fiber characteristics.

In one embodiment, an optical fiber connector assembly is provided. The optical fiber connector assembly comprising: an optical fiber having an optical fiber diameter D1, the optical fiber comprising a core, an inner cladding surrounding the core, and a titania doped outer cladding surrounding the inner cladding, the titania doped layer having between 4 wt. % to 16 wt. % titania based on the total weight of the titania doped outer cladding and having a thickness between 3 microns and 20 microns; a ferrule having a front end, a rear end, and a ferrule bore including a ferrule bore diameter and extending between the front end and the rear end, wherein at least a portion of the ferrule bore defines a microhole that has a microhole diameter D2; wherein a fit D2−D1 exists between the microhole and the optical fiber, and the fit is between 0 microns and −0.4 microns.

In another embodiment, the optical fiber connector assembly has an insertion loss of less than 0.25 decibels (dB) at a reference wavelength of 1550 nanometers (nm). In yet another embodiment, the optical fiber connector assembly has an insertion loss of less than 0.12 dB at a reference wavelength of 1550 nm. In another embodiment, a position change of an end of the optical fiber relative to the front end of the ferrule before and after thermal cycling according to Telecordia standard GR-326, Issue 4, Sections 4.4.2.1 to 4.4.2.6, is less than 30 mm. In another embodiment, the position change is less than 20 mm. In another embodiment, the position change is less than 10 mm. In another embodiment, the optical fiber has a maximum compressive stress in the titania-doped outer cladding between 75 MPa and 300 MPa. In another embodiment, the optical fiber has a maximum compressive stress in the titania-doped outer cladding between 100 MPa and 250 MPa. In another embodiment, the ferrule has a coefficient of thermal expansion sufficient to cause the microhole diameter D2 to expand when the ferrule is exposed to a heating temperature greater than 250° C. In another embodiment, the ferrule has a coefficient of thermal expansion sufficient to cause the microhole diameter D2 to expand when the ferrule is exposed to a heating temperature is greater than 400° C. In yet another embodiment, the ferrule bore comprises a counterbore adjacent to the microhole. In another embodiment, the ferrule further comprises a bonding agent positioned within the ferrule bore, the bonding agent having a viscosity less than 700 Pa.sec at the heating temperature. In another embodiment, the bonding agent has a viscosity of less than 500 Pa.sec at the heating temperature. In another embodiment, the bonding agent has a viscosity of less than 300 Pa.sec at the heating temperature. In another embodiment, the fit secures the optical fiber within the microhole to withstand a pull-out force of at least 2 pounds-force (lbf).

In another embodiment, a method of terminating an optical fiber with a ferrule; wherein the optical fiber comprises a core, an inner cladding surrounding the core, and a titania doped outer cladding surrounding the inner cladding, the titania doped outer cladding having between 4 wt. % to 16 wt. % titania based on the total weight of the titania doped outer cladding and having a thickness between 3 microns and 20 microns, and wherein the optical fiber has an optical fiber diameter D1; the ferrule having a front end, a rear end, and a ferrule bore extending between the front end and the rear end, wherein at least a portion of the ferrule bore defines a microhole that has a microhole diameter D2 is provided. The method comprises: heating the ferrule such that the microhole diameter D2 expands to be greater than the optical fiber diameter D1; inserting the optical fiber into the microhole while the microhole diameter D2 is expanded; and cooling the ferrule such that the microhole diameter D2 contracts to be less than the optical fiber diameter D1, wherein D2−D1 is between 0 microns and −0.4 microns.

In another embodiment, a speed of the inserting step is less than 10 millimeters per second (mm/sec). In another embodiment, the speed of the inserting step is less than 5 mm/sec. In another embodiment, heating the ferrule comprises heating the ferrule at a heating temperature greater than 250° C. In another embodiment, the heating temperature is greater than 300° C. In another embodiment, a bonding agent is preloaded into the ferrule bore and the heating the ferrule step melts the bonding agent. In another embodiment, a bonding agent is injected into the ferrule bore before the heating the ferrule step. In another embodiment, a bonding agent is injected into the ferrule bore during the heating the ferrule step.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to a process by which an optical fiber is terminated with a ferrule to form an optical fiber connector assembly. The ferrule is heated at a heating temperature whereby the ferrule bore (and ferrule microhole) expands. The optical fiber is then inserted into the ferrule microhole. The ferrule then contracts when heat is no longer applied resulting in an interference fit between the optical fiber and the ferrule microhole based on the dimensions of the optical fiber and the ferrule microhole. As used in this disclosure, "interference fit" refers to an outer diameter of the optical fiber being the same or greater than a diameter of the ferrule microhole. Conversely, "clearance fit" refers to the outer diameter of the optical fiber being less than the diameter of the ferrule microhole. The type of fit is determined by subtracting the outer diameter of the optical fiber from the diameter of the ferrule microhole such that values of zero or less (negative values) are associated with interference fits and values above zero are associated with clearance fits. The interference fits in this disclosure yield certain advantageous optical fiber characteristics within the optical fiber connector assembly, as will be described in greater detail below. The present disclosure also relates to an optical fiber connector assembly having an optical fiber with an outer cladding comprising titania-doped silica. Such an optical fiber may be particularly advantageous for forming optical fiber connector assemblies that include the type of interference fit mentioned in this paragraph, as will be described in greater detail below, although embodiments with such an optical fiber and a clearance fit with the ferrule microhole are also disclosed.

Optical Fiber Connector 10 and Optical Fiber Connector Assembly 100

Figure 1:
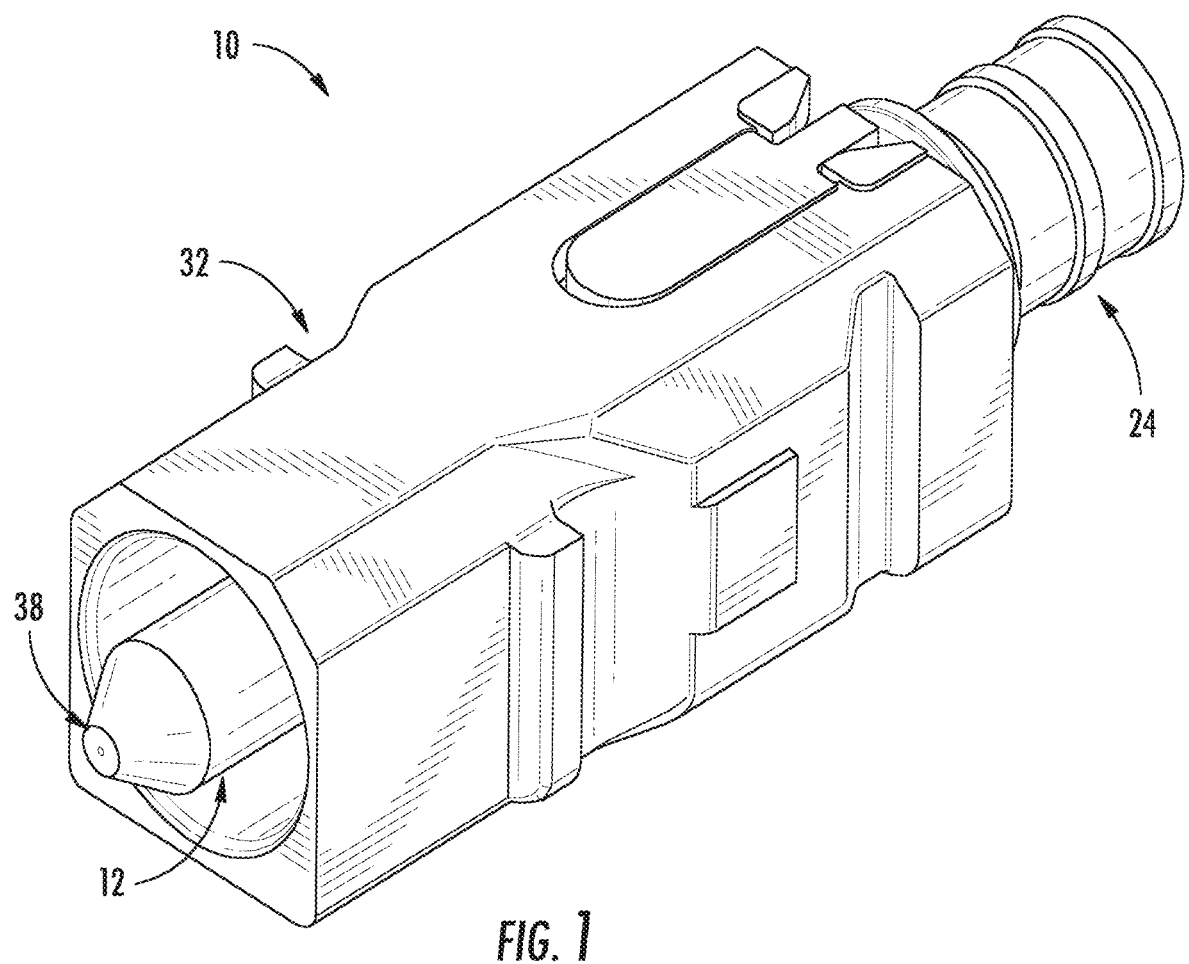
FIG. 1 is a perspective view of an example of an optical fiber connector ("connector")
Figure 2:
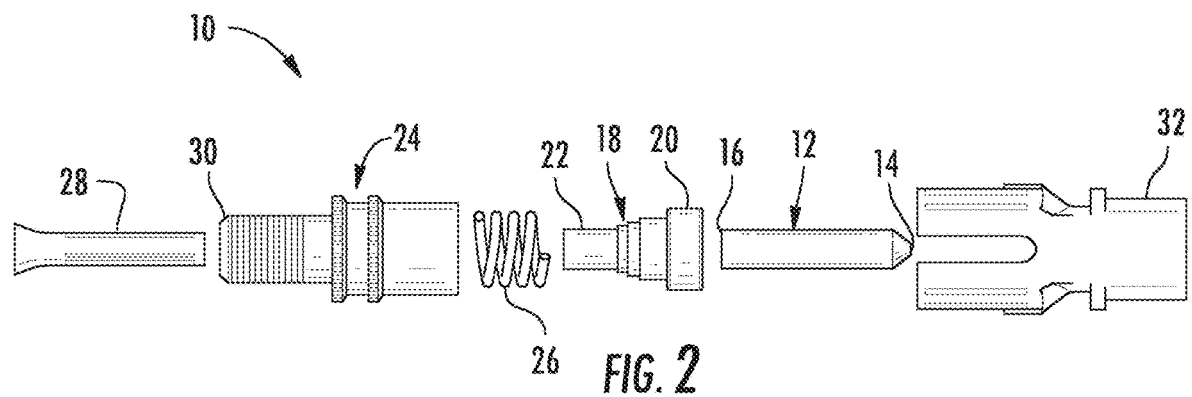
FIG. 2 is an exploded view of the connector of FIG. 1.
Figure 3:
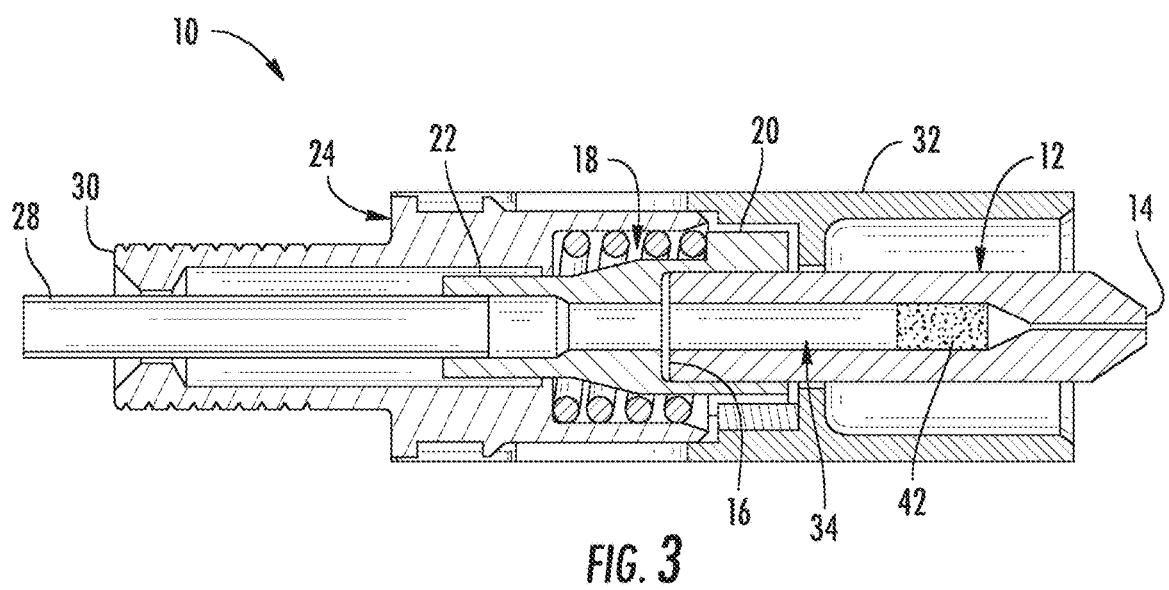
FIG. 3 is a cross sectional view of the connector of FIG. 1.

Referring to FIGS. 1-3, various views of an example of an optical fiber connector 10 are shown. Optical fiber connector 10 is configured to mate an optical fiber 50 (FIG. 5) with another optical fiber (not shown). Although optical fiber connector 10 is shown in the form of an SC-type connector according to IEC 61574-4:2013, this disclosure may be applicable to other connector types, such as LC (e.g., according to IEC 61754-20: 2012) and ST-type connectors (e.g., according to IEC 61754-2:1996). Again, optical fiber connector 10 is merely an example. The same holds true for optical fiber 50, which is merely an example of an optical fiber that can be used in connection with optical fiber connector assembly 100 and associated methods unless otherwise noted.

Figure 6:
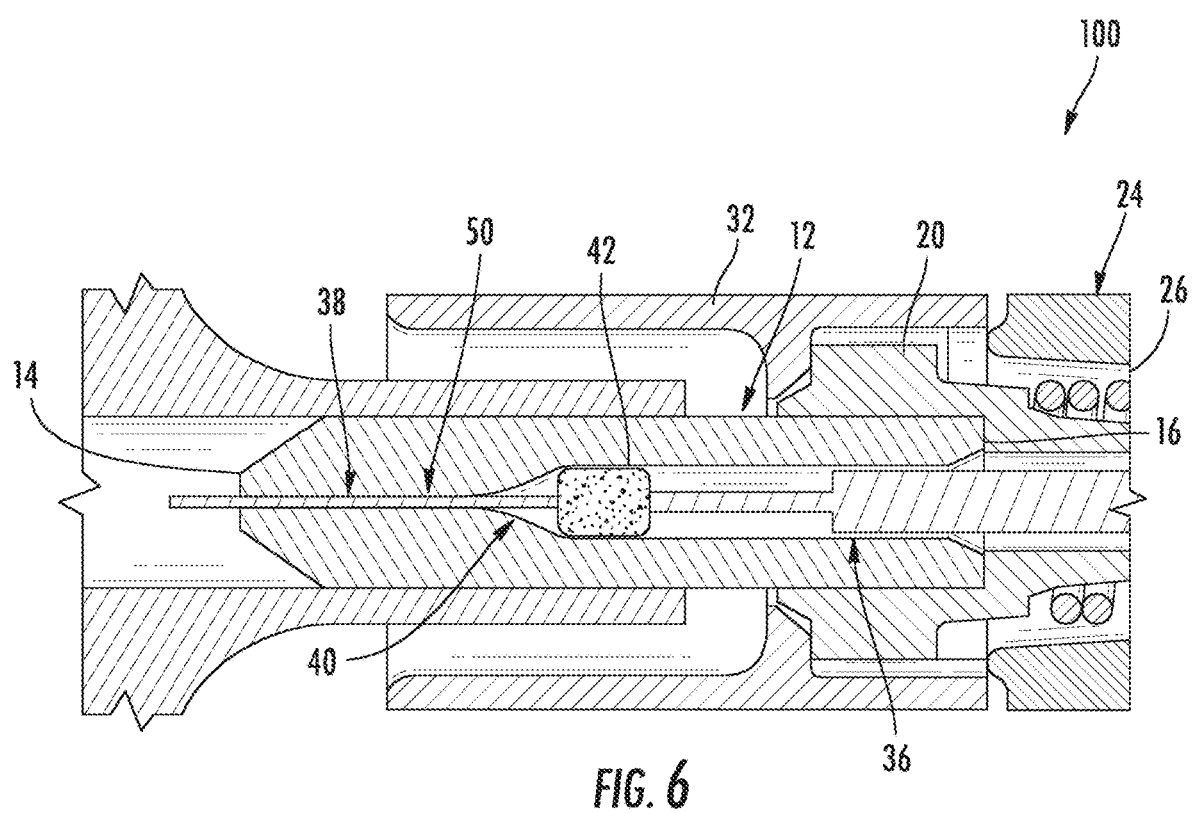
FIG. 6 is a cross sectional view of the connector of FIG. 1 with the optical fiber of FIG. 5 inserted into the connector.

Optical fiber connector 10 includes an inner housing 32 and a housing 24, which are coupled together and house internal components of optical fiber connector assembly 100 (FIG. 6).

Figure 4:
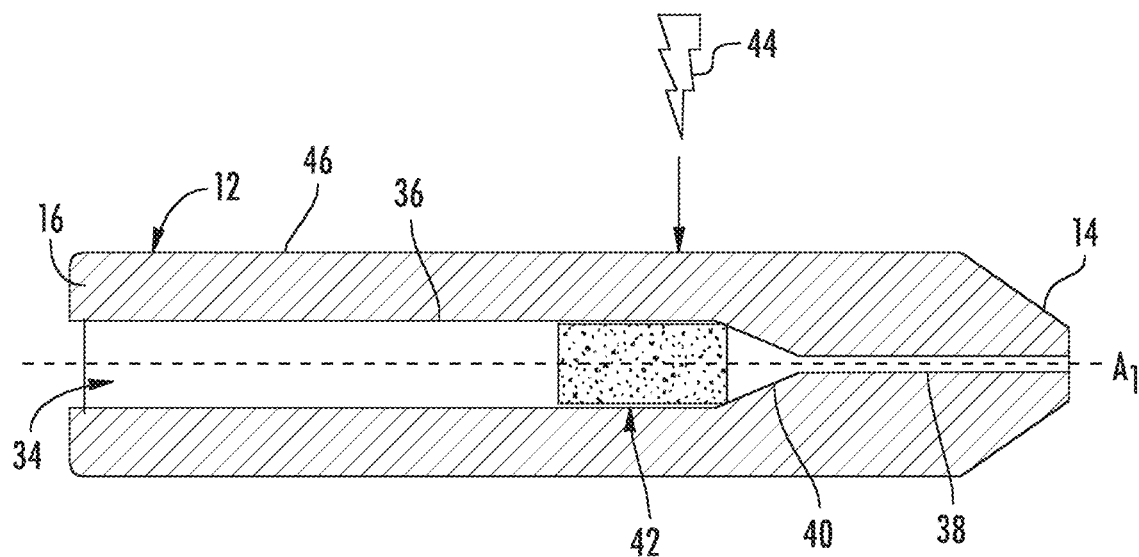
FIG. 4 is a cross sectional view of a ferrule of the connector of FIG. 1 showing heat applied to the ferrule.

Inner housing 32 receives or houses a ferrule 12, a ferrule holder 18, and housing 24. Ferrule 12 includes a front end 14 (also referred to as a mating end) and a rear end 16 (also referred to as an insertion end). Referring now to FIG. 4, an enlarged view of ferrule 12 is shown. Ferrule 12 may be the same as that described in U.S. Pat. No. 8,702,322 ("the '322 patent"), which describes many details related to the geometry of the ferrule, the location of a bonding agent within a bore of the ferrule, and possible compositions for the bonding agent, this information being incorporated herein by reference. In general, ferrule 12 includes a ferrule bore 34 extending between front and rear ends 14, 16 along a longitudinal axis A1. More specifically, the ferrule bore 34 has a first section or counter-bore section 36 extending inwardly from rear end 16 of the ferrule 12, a second section or ferrule microhole 38 (also referred to as "micro-hole" or "micro-hole section") extending inwardly from the front end 14 of the ferrule 12, and a transition section 40 located between the counter-bore section 36 and the ferrule microhole 38. The counter-bore section 36, ferrule microhole 38, and transition section 40 have respective lengths measured along or parallel to the longitudinal axis A1. The front and rear ends 14, 16 define respective front and rear end faces of the ferrule 12 that generally extend in planes parallel or substantially parallel to each other but substantially perpendicular to the longitudinal axis A1. In some embodiments, front end face 14 may be at a slight angle relative to the longitudinal axis A1 to provide, for example, an angled physical contact (APC) end face.

Still referring to FIG. 4, counter-bore section 36 of ferrule bore 34 has a first width, and ferrule microhole 38 has a second width less than the first width such that transition section 40 provides a decrease in width between counter-bore section 36 and ferrule microhole 38. More specifically, in the embodiment shown, counter-bore section 36 of ferrule bore 34 is a cylindrical bore extending from rear end 16 of ferrule 12 to transition section 40 such that the first width is a first diameter. Ferrule microhole 38 of ferrule bore 34 is a cylindrical bore extending from front end 14 of ferrule 12 to transition section 40 such that the second width is a second diameter. Accordingly, transition section 40 provides a decrease in diameter between the first diameter of counter-bore section 36 and the second diameter of ferrule microhole 38.

As shown in FIGS. 3 and 4, a bonding agent 42 is located in ferrule bore 34. Bonding agent 42 may be pre-loaded or stored within ferrule 12 (e.g., bonding agent 42 may be pre-loaded into the ferrule bore 34 by the manufacturer of ferrule 12) for a significant amount of time (e.g., at least an hour, a day, a year, etc.) before inserting optical fiber 50 (FIG. 5) into ferrule bore 34.

The '322 patent describes how the bonding agent 42 may be a free-flowing powder material coupled within transition section 40 of ferrule bore 34 via compression. The '322 patent also mentions that bonding agent 42 may alternatively be extruded.

Although the discussion of possible bonding agents in the '322 patent have been incorporated herein by reference, additional details relating to such bonding agents can be found in U.S. Pat. No. 8,696,215 ("the '215 patent") and U.S. Pat. No. 9,568,686 ("the '686 patent"), such details also being incorporated herein by reference.

Bonding agent 42 is configured to be heated and cooled relatively quickly to facilitate the termination process of a fiber optic cable, yet are also configured to provide sufficient coupling between the optical fiber(s) of a fiber optical cable and the ferrule bore 34. One specific example of bonding agent 42 is one that comprises a partially cross-linked polymer resin and a coupling agent that provides chemical coupling between the polymer resin and optical fiber(s) 50, ferrule 12, or both. The presence of the coupling agent allows the polymer resin to be selected primarily for heating and cooling properties rather than adhesion properties. Bonding agent 42 may even comprise a majority of the polymer resin so as to be largely characterized by the heating and cooling properties of the polymer resin. For example, bonding agent 42 may comprise between about 0.1 to about 10 parts by weight of the coupling agent per 100 parts by weight of the partially cross-linked polymer resin.

As used herein, "cross-linked" or "cross-linking" refers to the chemical bonding that connects a polymer chain to an adjacent polymer chain; "partially cross-linked" is where not all adjacent chains are bonded; and "partially cross-linkable" describes a chemical species that becomes partially cross-linked when sufficient heat is applied. It should be understood that the terms "partially cross-linked" and "partially cross-linkable" describe the same polymer resin before or after partially cross-linking. For example, a polymer resin may be described as partially cross-linkable when it is loaded into a ferrule and has not yet been heated to a temperature that results in the polymer resin partially or completely cross-linking.

One example of a partially cross-linkable polymer resin with desirable heating and cooling characteristics is polyphenylene sulfide. One example of a coupling agent having desirable adhesion characteristics is a coupling agent having a silane functional group, such as one or more of the following: an alkoxysilane, an oxime silane, an acetoxy silane, a zirconate, a titanate, a silane with an epoxy ring on one end and trimethoxy functional group at the other end, or combinations thereof. Other examples of partially cross-linkable polymers, coupling agents, and bonding agents are described in the '322 patent, '215 patent, and '686 patent.

The partially cross-linkable polymer resin of the bonding agent 42 has a melting temperature less than the cross-linking temperature. For example, the partially cross-linkable polymer resins above may each have a melting point at temperatures of less than 250° C., 270° C., or 290° C., yet each have a cross-linking temperature (i.e., the temperature at which the resin materials cross-link in the presence of air) of at least 300° C., 325° C., or even 350° C.

In one embodiment, a cross-linked polymer resin may have a melting point temperature of at least 250° C. or at least 300° C.

As mentioned above, the bonding agent 42 may be a free-flowing powder material at some point. The powder may bay a result of grinding various components of the bonding agent 42 (e.g., the partially cross-linkable resin) that are initially solid in to respective powders, and then mixing powders thoroughly together. Some components of the bonding agent 42 (e.g., the coupling agent) may be a liquid, but the fraction such components in the blend may be relatively small (e.g., less than 10 parts by weight of the overall blend) so that the resulting blend is still considered a free-flowing powder. For example, in one embodiment, the coupling agent may be pre-reacted with the thermoplastic powders in an organic solvent under refluxing conditions. After removal of the solvent, the treated powder remains. Under the conditions of refluxing solvent, some of the coupling agent may have become permanently bonded to the polymer.

In some embodiments, bonding agent 42 has a composition comprising a partially cross-linked resin that is a polymer and a coupling agent that chemically bonds the partially cross-linked resin to an inorganic surface of at least one of the optical fiber and the ferrule.

In some embodiments, bonding agent 42 has a viscosity that is less than 700 Pa.sec, less than 500 Pa.sec, or less than 300 Pa.sec at a heating temperature described herein.

As mentioned previously and referring back to FIGS. 1-3, inner housing 32 receives or houses ferrule holder 18 and housing 24 in addition to ferrule 12. Ferrule holder 18 includes a first end portion 20 and a second end portion 22. First end portion 20 receives rear end 16 of ferrule 12 while front end 14 of ferrule 12 remains outside ferrule holder 18. Second end portion 22 is received in housing 24, and a spring 26 may be disposed around second end portion 22 as discussed herein.

Housing 24 receives second end portion 22 and a lead in tube 28. As mentioned previously, spring 26 may be disposed around second end portion 22 and thereby, received in housing 24. Spring 26 is configured to interact with walls of housing 24 to bias ferrule holder 18 and ferrule 12. Lead in tube 28 extends from a rear end portion 30 of housing 24 to within second end portion 22 of ferrule holder 18 to help guide the insertion of optical fiber 50 (FIG. 5) into ferrule 12.

In a manner not shown herein, a fiber optic cable providing optical fiber 50 (FIG. 5) also includes one or more layers of material (e.g., strength layer of aramid yarn) that may be crimped onto rear end portion 30 of housing 24. A crimp band (or "crimp ring") may be provided for this purpose. Additionally, a strain-relieving boot (not shown) may be placed over the crimped region and extend rearwardly to cover a portion of the fiber optic cable. Variations of these aspects will be appreciated by persons familiar with the design of fiber optic cable assemblies. For example, other ways of securing a fiber optic cable to housing 24 are also known and may be employed in some embodiments. The embodiment shown in FIG. 1 is merely an example of an optical fiber connector assembly 100 to which the fiber optic connector sub-assemblies and methods provided in this disclosure may relate.

Referring now to FIGS. 4 and 6, illustrations of inserting an optical fiber 50 (FIG. 5) to assemble optical fiber connector assembly 100 is provided. To assemble optical fiber connector assembly 100 with an optical fiber 50 (FIG. 5), heat 44 is applied to ferrule 12 to bring ferrule 12 to a heated state. Heat 44 from a heating source (not shown, e.g., a heating port) is applied onto an outer surface 46 of ferrule 12 at a heating temperature such that bonding agent 42 melts and ferrule 12 expands as discussed below. In some embodiments, the heating temperature at which heat 44 is applied onto outer surface 46 is greater than 250° C., greater than 300° C., greater than 350° C., or greater than 400° C. As mentioned previously, when heat 44 is applied onto outer surface 46, ferrule 12 expands. Specifically, counter-bore section 36 and ferrule microhole 38 expand such that counter-bore section 36 expands to a diameter greater than the first diameter and ferrule microhole 38 expands to a diameter greater than the second diameter. In addition, when heated, the diameters of counter-bore section 36 and ferrule microhole 38 are greater than the outer diameter of optical fiber 50 to facilitate insertion of optical fiber 50 within ferrule 12 as discussed below. In comparison to the coefficient of thermal expansion (CTE) of ferrule 12, the CTE of optical fiber 50 (e.g., glass, silica glass, etc.) is small and therefore, the diameter change of optical fiber 50 when heat is applied (to ferrule 12) is small compared to the diameter change of the ferrule microhole 38 and counter-bore section 36. In one embodiment, ferrule microhole 38 has a diameter of between about 123.6 microns and 125.6 microns, which expands to between about 124.3 microns and 126.3 microns in the heated state; and optical fiber 50 has an outer diameter between about 124 microns and 126 microns in either an unheated or heated state.

Once ferrule 12 is in the heated state, optical fiber 50 is inserted into ferrule 12 through rear end 16. Optical fiber 50 is inserted through counter-bore section 36 and through melted bonding agent 42. Optical fiber 50 is also inserted through transition section 40 and through expanded ferrule microhole 38 such that at least a portion of optical fiber 50 protrudes outwardly from front end 14 of ferrule 12 and at least a portion of bonding agent 42 is within ferrule microhole 38. Optical fiber 50 is inserted into ferrule 12 at an insertion speed. In some embodiments, the insertion speed is less than 10 millimeters per second (mm/s) or less than 5 mm/s.

The insertion speeds of the present disclosure are advantageous given current size constraints of ferrule 12 and ferrule microhole 38. In the past, ferrules 12 and their corresponding ferrule microholes 38 were larger in size such that optical fibers 50 could be inserted at greater insertion speeds without damage to the optical fiber 50. However, as the sizes of ferrules 12 and corresponding ferrule microholes 38 decreased, such large insertion speeds of optical fibers 50 result in increased drag force applied onto the optical fiber 50. The increase in drag force can cause optical fiber 50 to buckle in ferrule microhole 38 resulting in mechanical interaction or physical interaction between optical fiber 50 and the walls of ferrule microhole 38. This interaction reduces the strength of optical fiber 50 and the reliability of optical fiber connector assembly 100.

Conversely, inserting the optical fiber 50 into ferrule 12 and ferrule microhole 38 at low insertion speeds result in increased manufacturing time in the assembly of optical fiber connector 10, which negatively affects throughput and reduces the total number of connectors that can be made in a period of time (i.e., reducing manufacturing efficiency).

As such, the insertion speeds of the present disclosure yield inserted optical fibers that do not interact with the wall of ferrule microhole 38 due to buckling but also provide manufacturing efficiency with respect to the production of optical fiber connectors 10. In addition, as discussed below, outer cladding 53 (FIG. 5) of optical fiber 50 provides improved surface characteristics (e.g., surface compressive stress and improved fiber fatigue characteristics) to provide additional protection for optical fiber 50 in interference fit configurations within ferrule microhole 38.

After optical fiber 50 is inserted into ferrule 12, heat 44 is no longer applied onto ferrule 12 such that ferrule 12 transitions to a cooled state. In the cooled state, ferrule 12 contracts to substantially its original configuration prior to heating. That is, in the cooled state, counter-bore section 36 and ferrule microhole 38 contract to substantially the first diameter and second diameter, respectively. The contraction of ferrule microhole 38 results in an interference fit between the previously inserted optical fiber 50 and ferrule microhole 38 with bonding agent 42 between optical fiber 50 and an inner wall of ferrule microhole 38. The interference fit ranges between about 0 microns and −0.5 microns, between about 0 microns and −0.4 microns, or between about 0 microns and −0.3 microns, where the interference fit is determined by subtracting the outer diameter of the optical fiber 50 from the diameter of the ferrule microhole 38 such that values of zero or less (negative values) are associated with interference fits and values above zero are associated with clearance fits as previously discussed.

Advantageously, reducing the diameter of the ferrule microhole (to form an interference fit configuration with optical fiber 50) assists with positioning of optical fiber 50 in ferrule microhole 38 by keeping optical fiber 50 more centered within ferrule 12 thereby, reducing the insertion loss when connecting optical fibers 50 to one another. By contrast, a larger ferrule microhole 38 can result in optical fiber 50 being positioned away from the center of ferrule 12 which can impact the performance of optical fiber connector assembly 100 (e.g., can cause insertion loss). The interference fit yields additional improved characteristics/properties for the inserted optical fiber 50 as discussed below.

Properties of Optical Fiber Connector 10 and Optical Fiber Connector Assembly 100

In some embodiments, optical fiber connector assembly 100 has an insertion loss of less than 0.25 decibels (dB), less than 0.12 dB, or less than 0.05 dB at reference wavelengths between 1310 nanometers (nm) and 1625 nm as measured by methods known in the art. For example, in one embodiment, the reference wavelength is 1550 nm. In some embodiments, optical fiber connector assembly 100 has an insertion loss of less than 0.25 decibels (dB), less than 0.12 dB, or less than 0.05 dB at a reference wavelength of 1310 nanometers (nm) as measured by methods known in the art. In some embodiments, optical fiber connector assembly 100 has an insertion loss of less than 0.25 decibels (dB), less than 0.12 dB, or less than 0.05 dB at a reference wavelength of 850 nanometers (nm) as measured by methods known in the art.

In some embodiments, optical fiber 50 has a fiber movement within optical fiber connector assembly 100 of less than 30 nanometers (nm), less than 20 nm, or less than 10 nm as measured by the methods disclosed below.

In some embodiments, optical fiber 50 has a pre-thermal cycling fiber pull-out force of greater than 3 pounds force (lbf), greater than 5 lbf, or greater than 7 lbf as measured by the method outlined below. In some embodiments, optical fiber 50 has a post-thermal cycling (aged) fiber-pull out force of greater than 2 lbf, greater than 3 lbf, or greater than 5 lbf as measured by the method outlined below and under thermal cycling conditions. As used herein, "thermal cycling" refers to temperature and humidity cycling in which an optical fiber connector assembly 100 is loaded into a thermal and humidity-controlled chamber and cycled according to the method disclosed in Telecordia standard GR-326, Issue 4, Sections 4.4.2.1 to 4.4.2.6.

Examples Relating to Optical Fiber Connector Assembly 100

FIGS. 7-11 illustrate representative data for single mode optical fibers inserted into ferrule 12 with different interference fits or clearance fits. While these Examples relating to optical fiber connector assembly 100 reference using single mode optical fibers, it is within the scope of the present disclosure that alternate types of optical fibers may be used (e.g., multimode optical fibers, etc.) to yield the properties discussed above.

Table 1 below represents the combination of the ferrule inner diameter (ID) and optical fiber outer diameter (OD) that were tested with the amount of clearance or interference determined by subtracting the ferrule microhole inner diameter from the optical fiber outer diameter. The ferrules used were ferrules for SC connectors with angled physical contact (APC) end face geometry. The ferrules had their respective ferrule microhole diameters measured with pin gauges. Each individual ferrule ID was measured with a pin gauge and sorted/binned accordingly. Ferrules were then filled with a bonding agent comprising polyphenylene sulfide and then assembled into optical fiber connector assembly. Each optical fiber sample was also individually measured, and the resultant optical fiber OD was matched to the appropriate ferrule ID to give the necessary clearance fit or interference fit. This process was continued until there were seven groups of optical fiber and ferrule combinations with thirty-five or more samples in each group.

TABLE 1

| Fiber OD (μm) | Ferrule ID (μm) | Clearance Fit/ Interference Fit (μm) | Number of Samples |
|---|---|---|---|
| 124.9 | 125.4 | 0.500 | 35 |
| 124.9 | 125.2 | 0.300 | 35 |
| 125.0 | 125.1 | 0.100 | 35 |
| 125.1 | 125.0 | −0.100 | 35 |
| 125.3 | 125.0 | −0.300 | 35 |
| 125.4 | 125.0 | −0.400 | 35 |
| 125.5 | 125.0 | −0.500 | 35 |

After the connector is assembled, the optical fiber connector assembly sample(s) were tested for insertion loss, insertion force (drag force), and environmental testing (e.g., pull-out, fiber movement) performance. Some of the samples had the optical fiber protruding out of the front face of the ferrule by 4 millimeters (mm). The protruding optical fiber was trimmed back to 2 millimeters (mm) for pull-out testing (discussed below). Other samples that had the optical fiber protruding out of the face of the ferrule had the protruding optical fiber trimmed/cleaved using a diamond wire saw, such as that disclosed in U.S. Pat. Nos. 10,295,747 or 9,829,633. The samples with cleaved optical fibers were polished with the ferrules in preparation for fiber movement testing (discussed below). Thus, one batch of the samples had protruding optical fibers to allow the pull-out testing procedure described below, while another batch of the samples had cleaved and polished optical fibers to allow the fiber movement testing described below.

As mentioned previously, the following data discussed herein may reference temperature and humidity cycling (referred to as "thermal cycling") in which an optical fiber connector assembly 100 is loaded into a thermal and humidity-controlled chamber and cycled according to the method disclosed in Telecordia standard GR-326 Issue 4, Sections 4.4.2.1 to 4.4.2.6.

Fiber Movement

Sample optical fiber connector assemblies selected for fiber movement testing required polishing before testing. After the connectors were polished as discussed above, an initial ferrule end face geometry measurement was taken to measure apex offset and undercut or protrusion spherical fiber height. The samples were then measured for an initial insertion loss measurement and loaded into a thermal and humidity controlled chamber where the samples were thermally cycled as discussed above. Insertion loss was actively monitored during thermal cycling to measure insertion loss changes. Insertion loss properties of sample optical fiber connector assemblies are discussed herein below.

Figure 7:
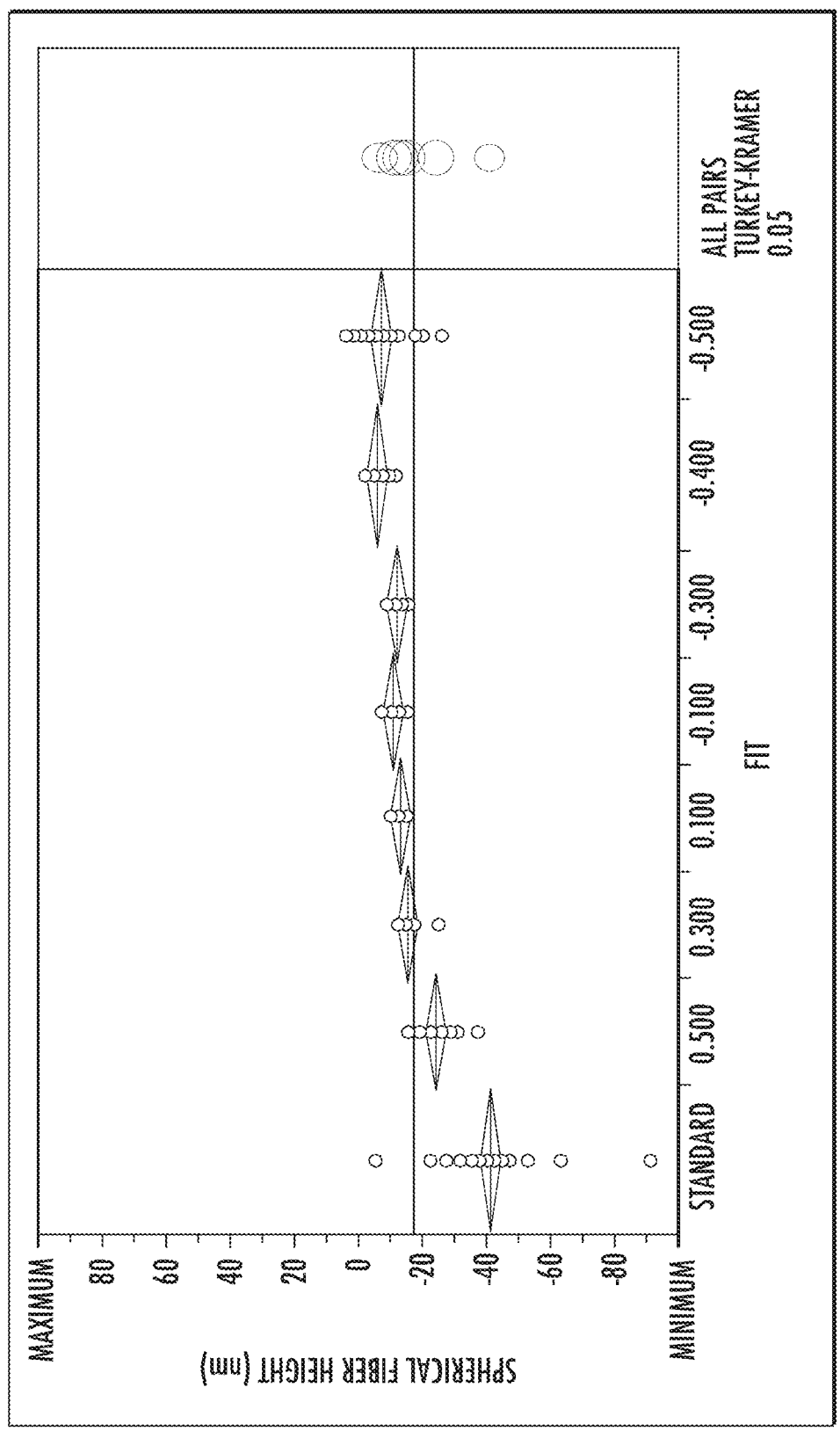
FIG. 7 is a graph illustrating spherical fiber height of the optical fiber of FIG. 5 in relation to fit between the optical fiber and a ferrule microhole.

Referring to FIG. 7, fiber movement for different interference fit configurations between optical fiber 50 and ferrule microhole 38 after thermal cycling is illustrated. As used herein, "fiber movement" refers to the measured position change of an end of the optical fiber 50 relative to front end 14 of ferrule 12 before and after thermal cycling according to Telecordia standard GR-326, Issue 4, Sections 4.4.2.1 to 4.4.2.6. As shown, the sample optical fibers showed that for all interference fit conditions, optical fibers were within the minimum and maximum specification limits shown with limited variability in spherical fiber height. Also, as the fit changes from 0 microns to −0.5 microns (i.e., as interference increases), the fiber movement performance improves (i.e., the magnitude of fiber movement decreases) as there is less variability in the spherical fiber height. Moreover, in comparison with the standard fit (clearance fit of 0.6 microns), fiber movement improves/decreases (i.e., less variability in spherical fiber height) as the fit decreases (i.e., clearance fit decreases/interference fit increases).

As used in the Examples and corresponding Figures, references to "Standard" or "standard fit" refer to a fit between the ferrule and the optical fiber in which the difference in diameters of the ferrule microhole and the optical fiber is 0.6 microns (i.e., a clearance fit of 0.6 microns) unless otherwise stated.

Insertion Loss

Figure 8:
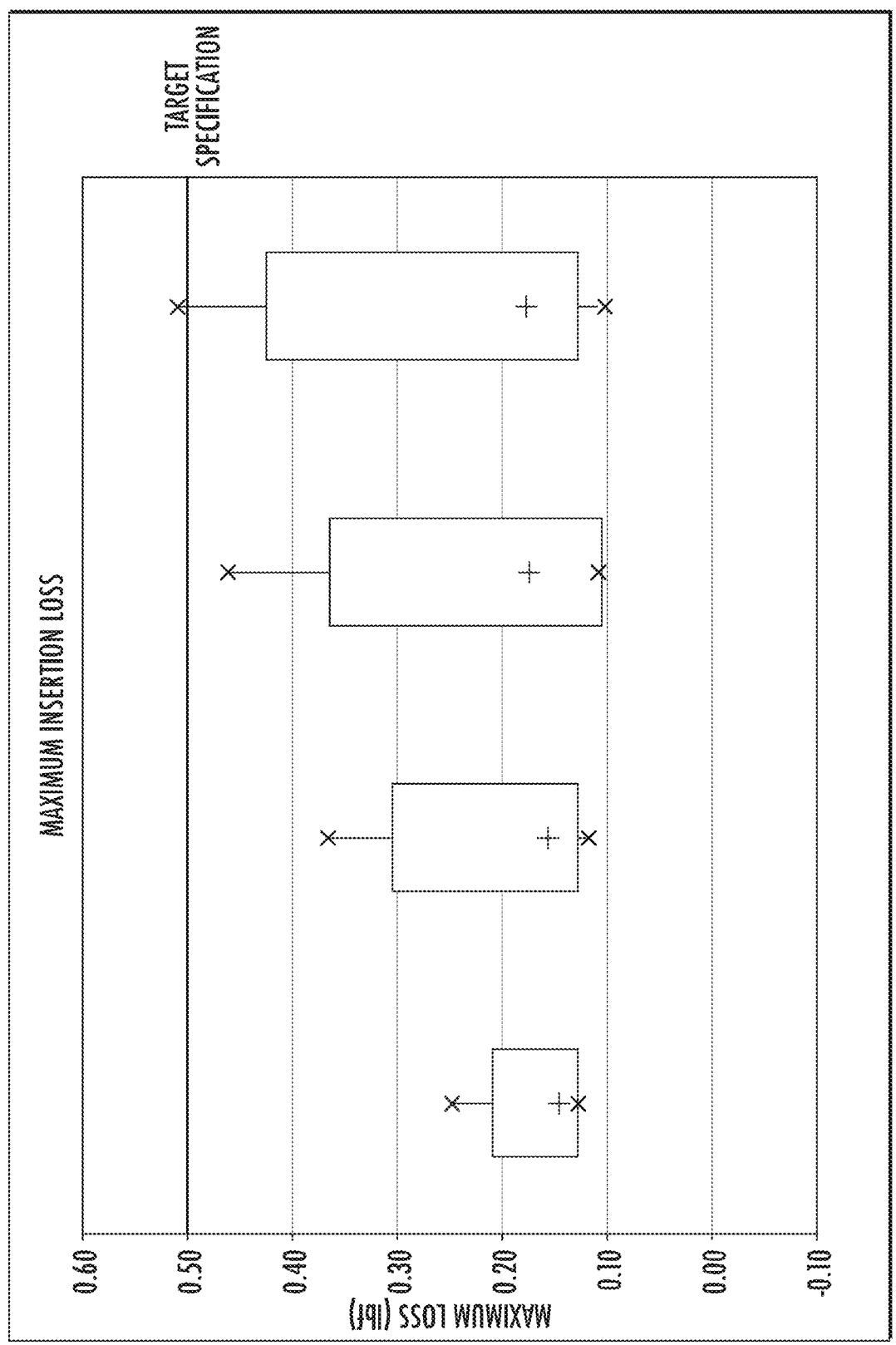
FIG. 8 is a graph illustrating maximum insertion loss in relation to fit between the optical fiber of FIG. 5 and a ferrule microhole.

Referring now to FIG. 8, maximum insertion loss is measured relative to interference fit for randomly mated, thermally cycled optical fiber connector assemblies 100 according to standard methods known in the art and/or methods disclosed in Telecordia standard GR-326, Issue 4, Section 4.4.1 is illustrated. As shown, regardless of the interference fit, most samples showed a measured maximum insertion loss and a measured maximum insertion loss compliance with a target specification as indicated in FIG. 8. In addition, all samples passed the back reflectance specification according to the target specification.

Fiber Pull-Out

Figure 9:
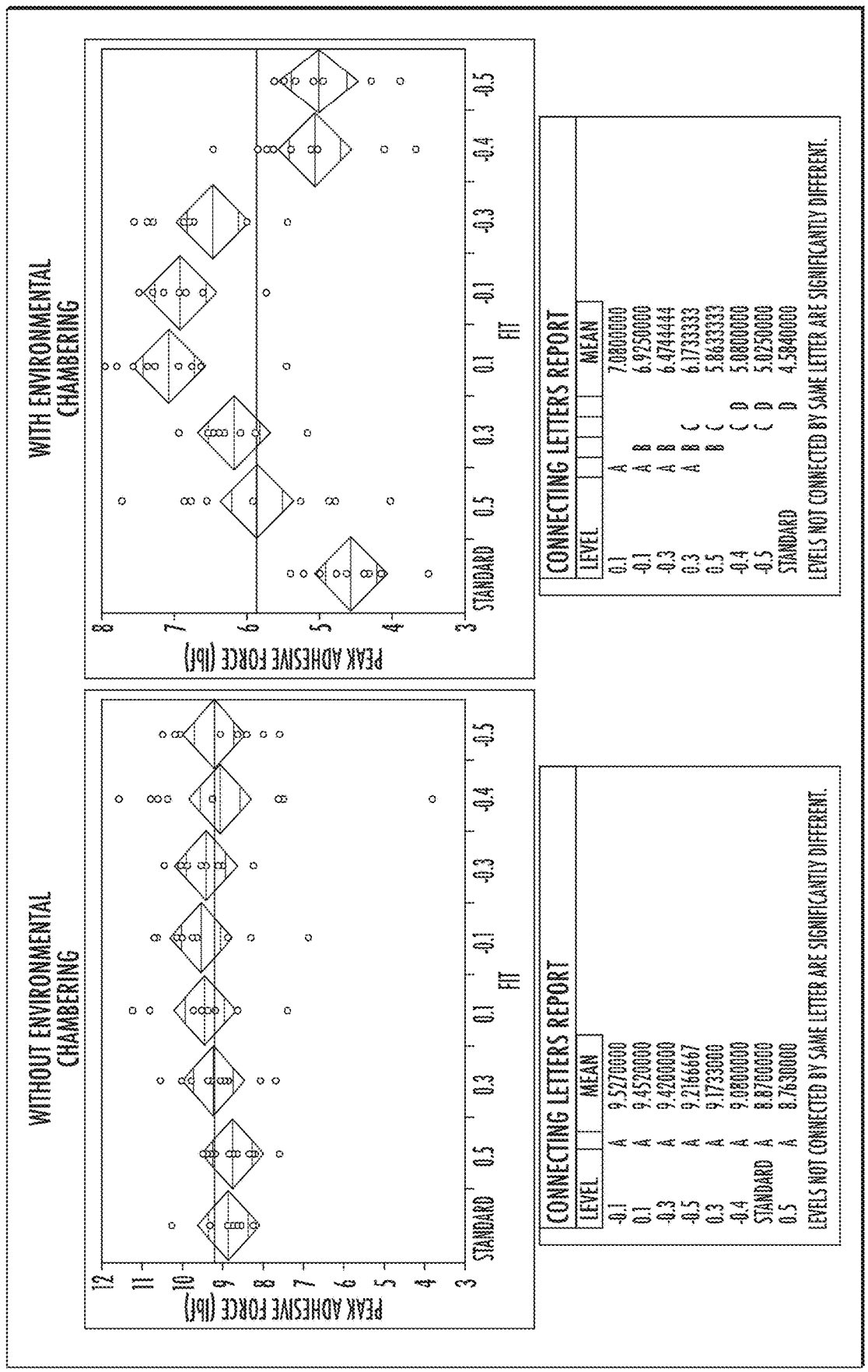
FIG. 9 is a graph illustrating pull-out force of the optical fiber of FIG. 5 prior and post temperature and humidity (thermal) cycling.

Referring now to FIG. 9, a statistical comparison of optical fiber pull-out force prior to and after thermal cycling outlined in Telecordia standard GR-326, Issue 4, Sections 4.4.2.1 to 4.4.2.6 is illustrated. Optical fiber pull-out force was measured by using a force gauge and associated apparatus to impart opposite axial forces on the optical fiber and the ferrule. The pull-out test procedure generates data relating to the maximum force, the force when the optical fiber stub protruding from the front of the ferrule begins to move, and the failure mode. There are five failure modes: break, slip, pull, slip break, and no fiber stub. If the failure mode was a break, the location of the break was measured relative to the edge of the coating and recorded.

Fiber pull-out testing was performed on 120 samples. The pull-out force along with the failure modes were recorded for both pre and post thermal cycling as shown in Table 2 below. As shown in Table 2, there is a degradation in optical fiber to ferrule adherence when a sample was subjected to thermal cycling. Table 2 also shows how the dominate failure mode shifts (from "Slip" or "Pull" to "Break") different modes after connector assembly 100 has been exposed to high temperature and humidity.

TABLE 2

| FIT (μm) | Pre-Chamber Treatment (Pre-Thermal Cycling) | | Post Chamber Treatment (Post Thermal Cycling) | |
|---|---|---|---|---|
| | Average Pull Out Force (lbf) | Failure Mode | Average Pull Out Force (lbf) | Failure Mode |
| Standard | 8.9 | Slip | 4.6 | Slip |
| 0.500 | 8.8 | Pull | 5.9 | Slip |
| 0.300 | 9.2 | Pull | 6.2 | Break |
| 0.100 | 9.5 | Pull | 7.1 | Break |
| −0.100 | 9.5 | Pull/Break | 6.9 | Break |
| −0.300 | 9.4 | Pull/Break | 6.5 | Break |
| −0.400 | 9.1 | Break | 5.1 | Break |
| −0.500 | 9.2 | Break | 5.0 | Break |

Referring now to FIG. 9, a graph of the pull-out data of Table 2 is provided. As shown, the pull-out force under both conditions (pre and post environmental testing (e.g., thermal cycling) was greater than the threshold 2 pounds force (lbf) requirement for the connector assemblies 100. FIG. 9 also shows the statistical analysis of the fiber pull-out results for both pre and post chambering/thermal cycling. As shown, the pre-chamber data showed no statistical difference among the data sets (i.e., varying fits—clearance or interference— between the ferrule (e.g., ferrule microhole) diameter and the optical fiber diameter). By contrast, the post-chamber data showed a statistical difference among the data sets. Specifically, the pull-out force was lower when the clearance and interference fit were at their largest respective values. The highest post chamber pull-out results were when the fit ranged between −0.100 μm and 0.100 μm.

Fiber Insertion Force/Drag Force

Figure 10:
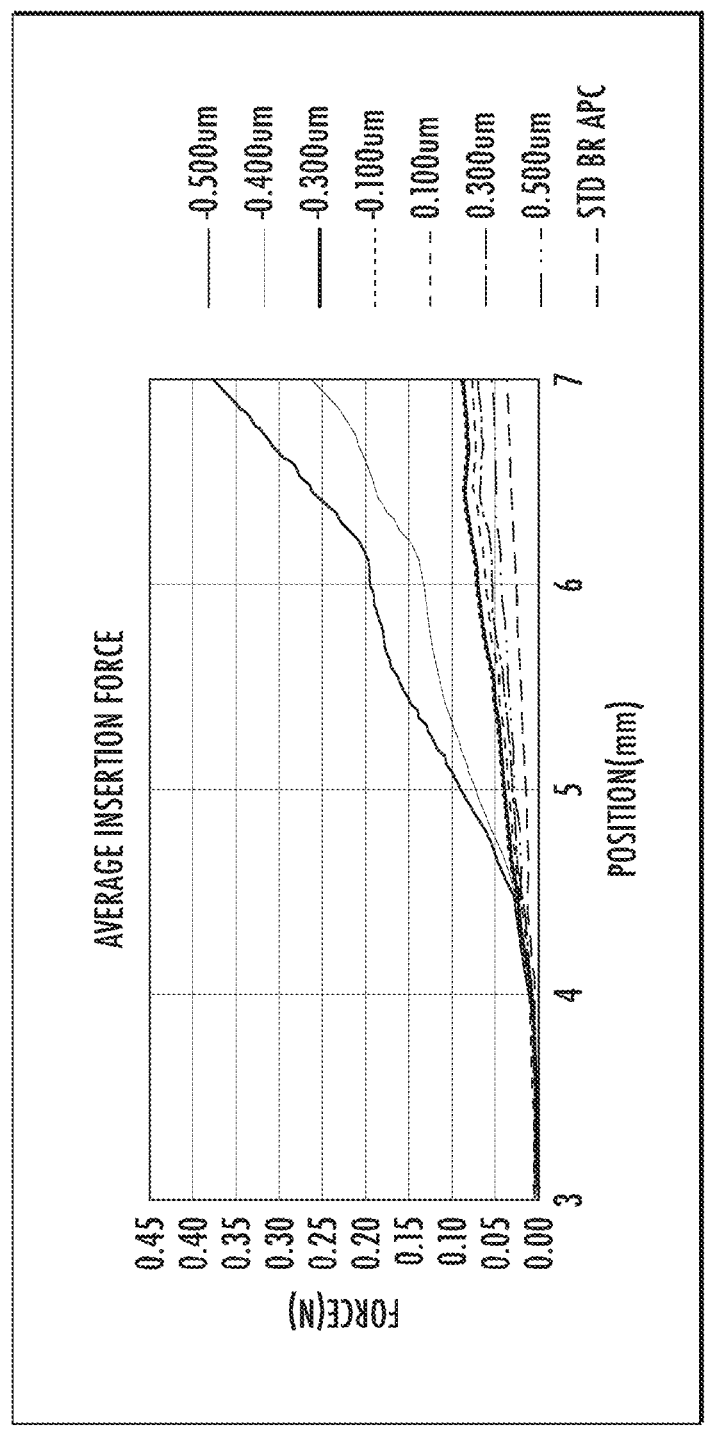
FIG. 10 is a graph illustrating average insertion force of the optical fiber of FIG. 5 in relation to fit between the optical fiber and a ferrule microhole.
Figure 11:
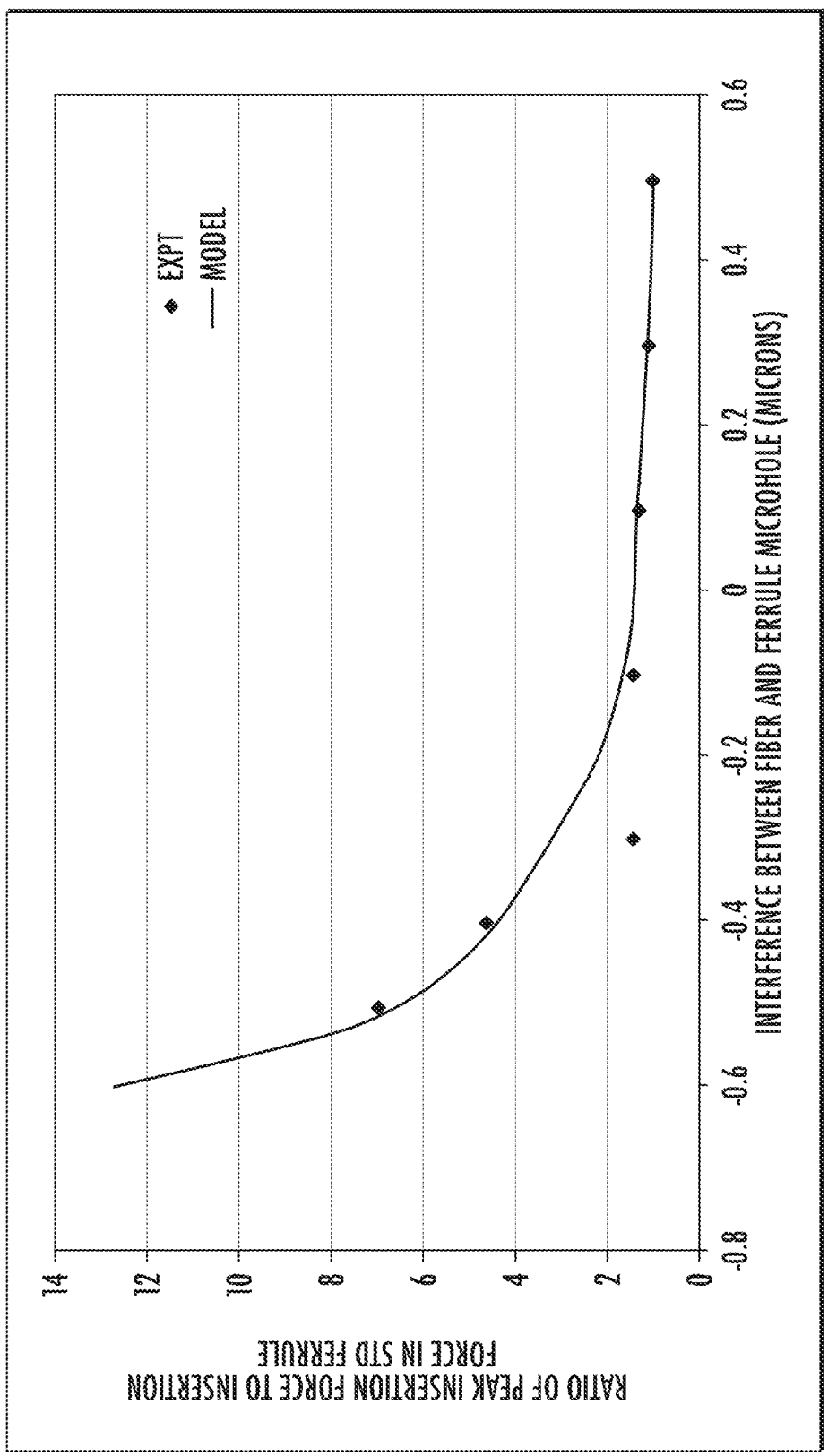
FIG. 11 is a graph illustrating a comparison between experimental and model predictions for percent increase in drag force for different fits between the optical fiber and a ferrule microhole.

Referring now to FIGS. 10 and 11, insertion force data is shown for varying fits between the ferrule (i.e., ferrule microhole) and the optical fiber is illustrated. Insertion force represents the drag force that the optical fiber experiences due to the pressure and the shear forces that the bonding agent exerts on the optical fiber as it translates through the ferrule and connector. Insertion force on the optical fiber was measured using a load cell as the optical fiber is inserted in the connector. As shown in FIGS. 10 and 11, as the magnitude of the interference fit increased, the insertion forces increased. In particular, modest increases in the insertion force are shown for fits between 0 microns and −0.3 microns (i.e., interference fits), and significant increases are shown for fits greater than −0.4 microns (i.e., interference fits greater than 0.4 microns). To balance the insertion loss, fiber movement, and reliability performance, in some embodiments, the difference between the ferrule microhole diameter D2 and the optical fiber diameter D1 (i.e., D2−D1) is between 0 microns and −0.4 microns. In other embodiments, the difference between the ferrule microhole diameter D2 and the optical fiber diameter D1 is between 0 microns and −0.3 microns.

Optical Fiber 50

Figure 5:
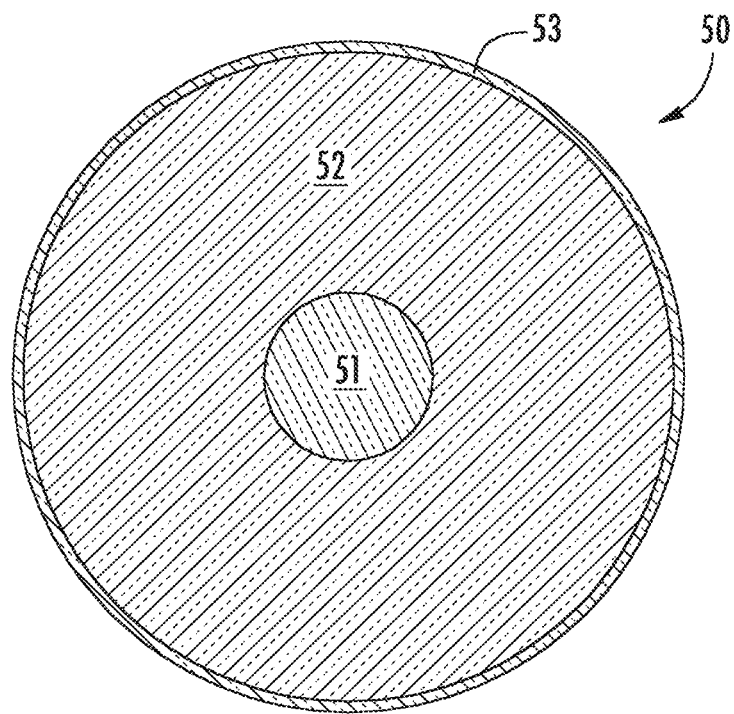
FIG. 5 is a cross sectional view of an example of an optical fiber having a titania-doped outer cladding, the optical fiber configured to be inserted into the ferrule of FIG. 4 and the connector of FIG. 1.

Although the methods described above can be used with different types of optical fibers, certain types of optical fibers provide additional properties discussed below. Referring now to FIGS. 5 and 6, an optical fiber 50 configured to be inserted into ferrule 12 and optical fiber connector assembly 100 is shown. Optical fiber 50 includes a core 51, an inner cladding 52 surrounding core 51, and an outer cladding 53 surrounding core 51 and inner cladding 52. Core 51 and inner cladding 52 are composed of materials with an appropriate refractive index differential to provide desired optical characteristics. Inner cladding 52 includes all glass portions (e.g., silica glass) of an optical fiber 50 outside core 51 and is not limited to glass portions of optical fiber 50 outside of core 51 which are optically functional.

Outer cladding 53 is a titania-doped outer cladding applied onto cladding 52 to provide improved surface characteristics to optical fiber 50. Examples of optical fibers with such a construction are disclosed in U.S. Pat. No. 5,318,613, the disclosure of which is hereby incorporated by reference. For example, in one embodiment, outer cladding 53 comprises silica doped with titania ($TiO_2$—$SiO_2$) with varying titania concentrations. In some embodiments, outer cladding 3 has a titania concentration between 4 wt. % and 20 wt. %, between 4 wt. % and 16 wt. %, between 6 wt. % and 14 wt. %, or between 8 wt. % and 12 wt. % based on the total weight of outer cladding 53. Outer cladding 53 may have a thickness between 1 micron and 20 microns, between 2 microns and 15 microns, or between 2 microns and 10 microns.

Exemplary Properties of Optical Fiber 50

The interference fit configuration between ferrule microhole 38 and optical fiber 50 can result in buckling of optical fiber 50 during insertion of the optical fiber 50 into ferrule microhole 38 (due to increased drag force applied onto optical fiber 50 during the optical fiber insertion). Buckling of optical fiber 50 can reduce the strength of optical fiber 50 and the reliability of optical fiber connector assembly 100. Outer cladding 53 of optical fiber 50 provides improved surface characteristics (e.g., surface compressive stress and improved fiber fatigue characteristics) to protect optical fiber 50 in such interference fit configurations within ferrule microhole 38 as discussed below.

In some embodiments, optical fiber 50 has a maximum compressive stress in the titania-doped outer cladding between 75 megapascals (MPa) and 300 MPa, between 100 MPa and 250 MPa, or between 100 MPa and 200 MPa as measured by a polariscope or using traverse interferometry in accordance with the method described below.

In some embodiments, optical fiber 50 is a single mode optical fiber having optical properties compatible with ITU-G.652.D specification. In some embodiments, optical fiber 50 is a bend insensitive single mode optical fiber having optical properties compatible with ITU-G.657.A1, ITU-G.657.A2 or ITU-G.657.B3 specifications. In some embodiments, optical fiber 50 is a multimode optical fiber having optical bandwidth performance compatible with OM2 specifications. In some embodiments, optical fiber 50 is a multimode optical fiber having optical bandwidth performance compatible with OM3 specifications. In some embodiments, optical fiber 50 is a multimode optical fiber having optical bandwidth performance compatible with OM4 specifications.

Examples Relating to Optical Fiber 50

Similar to the Examples section above, FIGS. 12-16 illustrate representative data for optical fibers 50 (FIG. 5) and the properties associated with optical fiber 50.

Compressive Stress

An increase in the insertion force/drag force exerted on the optical fiber can result in buckling of the optical fiber during the insertion and interaction between the optical fiber and the ferrule microhole that can result in optical fiber breaks and/or reliability issues. Also, residual stresses in optical fibers are induced due to the viscosity and coefficient of thermal expansion differences from radial composition distribution (between glass core and titania-doped cladding). As discussed previously, optical fibers of the present disclosure are provided with an outer cladding comprising titania-doped silica to improve the strength of the optical fiber and the reliability of the optical fiber connector assembly. The mismatch in the properties result in thermal and mechanical stresses induced during the manufacture of optical fiber (e.g., drawing process).

Residual stresses in optical fibers are measured using a polariscope or using traverse interferometry in accordance with well-documented methods in literature and familiar to those skilled in the art. The method used in the present disclosure includes immersing the optical fiber in an index matching fluid and impinging a light from a light source onto the optical fiber laterally. The ray entering the optical fiber is split into two components due to stress-induced birefringence, and the two components experience different refractive indices in the optical fiber. As the light exits the optical fiber, the two components experience a phase shift called retardation, with the magnitude of the retardation being a function of the ray incident position. The residual stresses can be estimated from the measurements of retardation as a function of ray incident position. The measurement of stresses using this method can be performed using an IFA instrument available from Interfiber Analysis LLC (Sharon, Mass., USA). As mentioned previously, an alternate method of measuring residual stresses using the transverse interferometry method may be used.

As discussed below and with reference to FIGS. 12-16, optical fibers with titania-doped outer cladding results in improved surface compressive stress and improved fiber fatigue characteristics.

Figure 12:
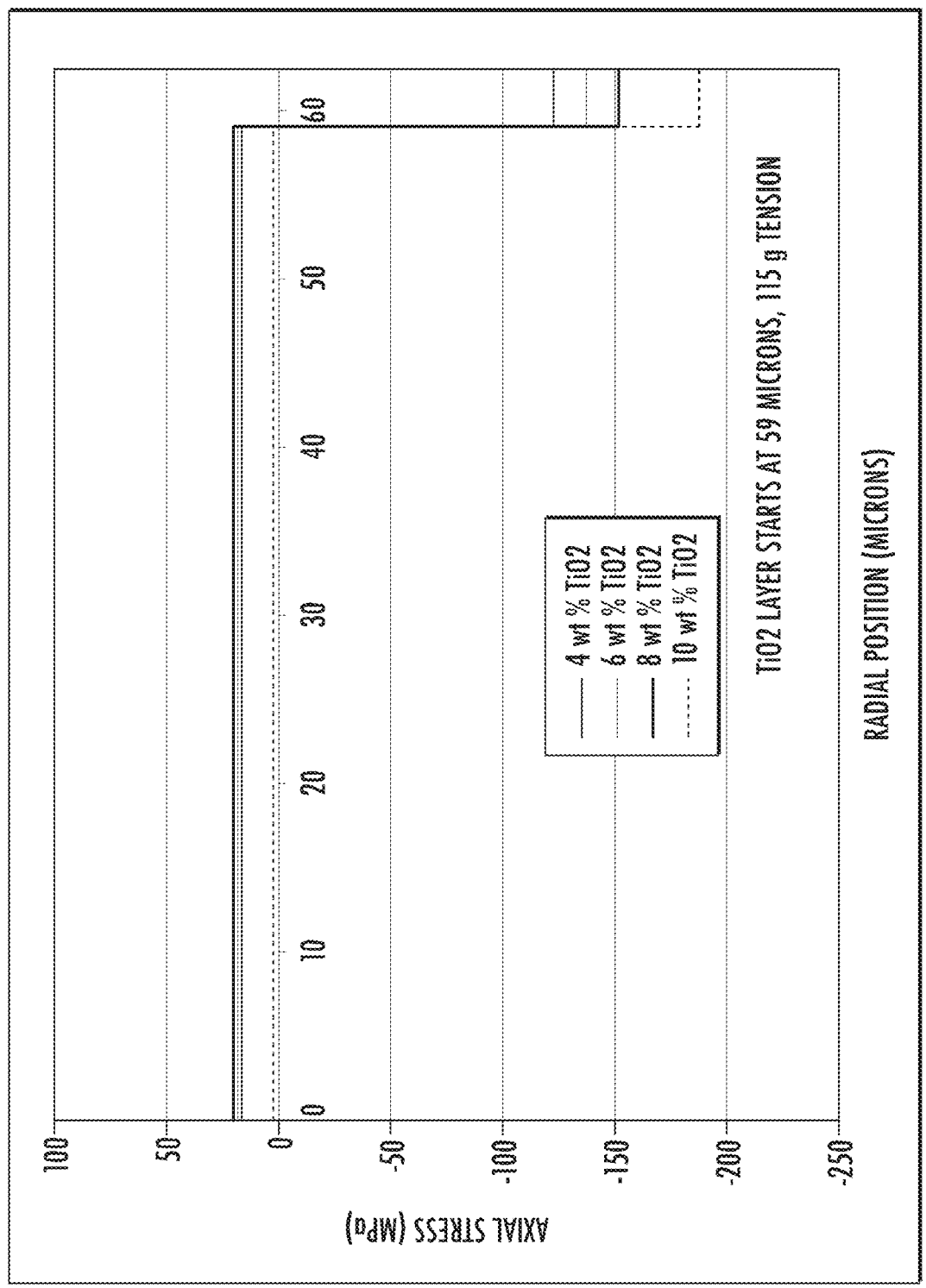
FIG. 12 is a graph illustrating the compressive axial stresses of single mode optical fibers having outer cladding layers with varying titania content.

FIG. 12 shows data for the calculated draw induced residual stresses in single mode optical fiber samples having outer cladding layers with a thickness of 3.5 microns and with different titania weight compositions based on the total weight composition of the titania-doped outer cladding. The samples were drawn at a draw tension of 115 grams. As shown, the titania-doped layer of the optical fiber samples is positioned on the outer cladding of the optical fiber, which is 59 microns from a fiber core. As shown, the samples each have stress values less than 0 megapascals (MPa) indicating that the sample is in compression. In this state of compression, cracks in the outer cladding layer do not propagate and damage the optical fiber, thereby protecting the optical fiber from potential losses due to mechanical failure of the optical fiber.

Figure 13:
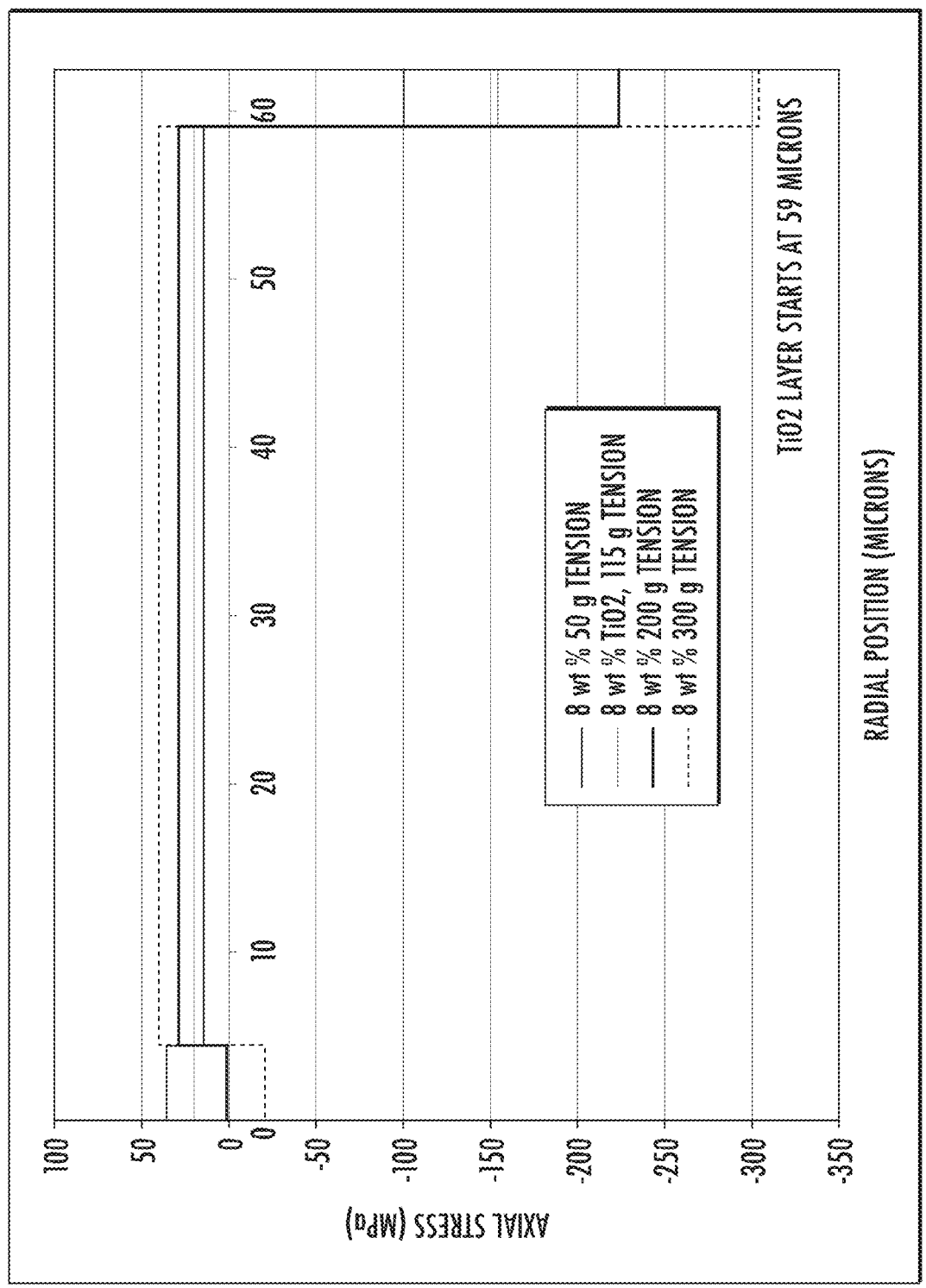
FIG. 13 is a graph illustrating the compressive axial stresses of single mode optical fibers having outer cladding layers with titania with varying tensions applied.

FIG. 13 shows data for calculated draw induced residual stresses in single mode optical fiber samples having a titania-doped outer cladding layer thickness of 3.5 microns and a titania concentration of 8 wt. % based on the total weight composition of the titania-doped outer cladding. As shown, the optical fiber samples were drawn at varying tensions. As shown, greater draw tensions induced a greater amount of compressive stress onto the optical fiber samples. As mentioned previously, compressive stress values less than 0 MPa indicate that the optical fiber sample is under compression which provides advantageous benefits outlined above.

Figure 14:
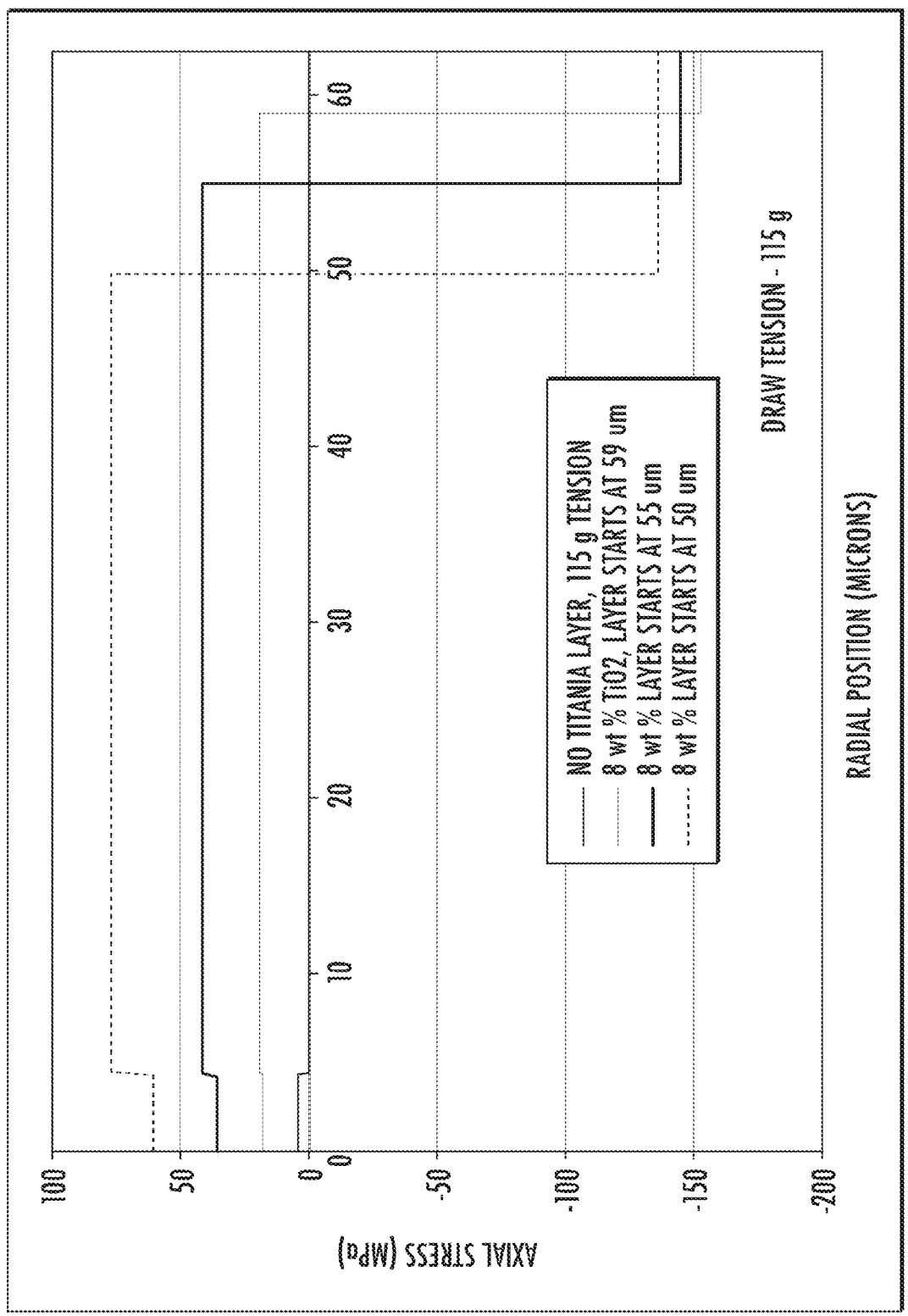
FIG. 14 is a graph illustrating the compressive axial stresses of single mode optical fibers having outer cladding layers with varying titania content and thicknesses.

FIG. 14 shows data for induced residual stresses in single mode optical fiber samples having different titania-doped outer cladding thicknesses with a constant outer diameter and titania concentration of 8 wt. % based on the total weight composition of the titania-doped outer cladding. The optical fiber sample was drawn at a constant draw tension of 115 grams. As shown, the optical fiber sample having an undoped outer cladding (i.e., with no titania) had a stress of 0 MPa, and the optical fiber samples with a titania-doped silica outer cladding had a compressive stress less than 0 MPa which provides advantageous benefits outlined above.

Figure 15:
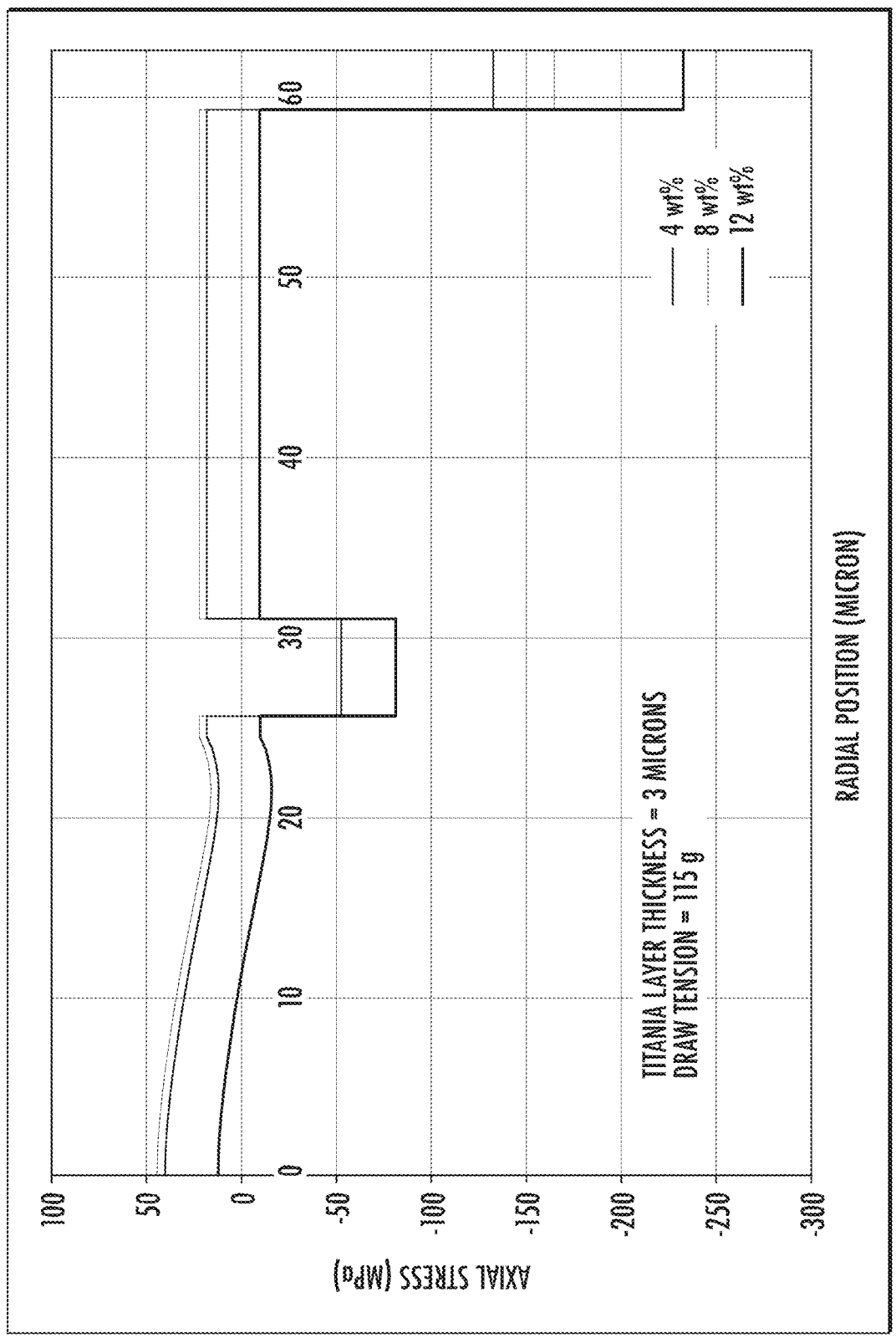
FIG. 15 is a graph illustrating the compressive axial stresses of multimode optical fibers having outer cladding layers with varying titania content.
Figure 16:
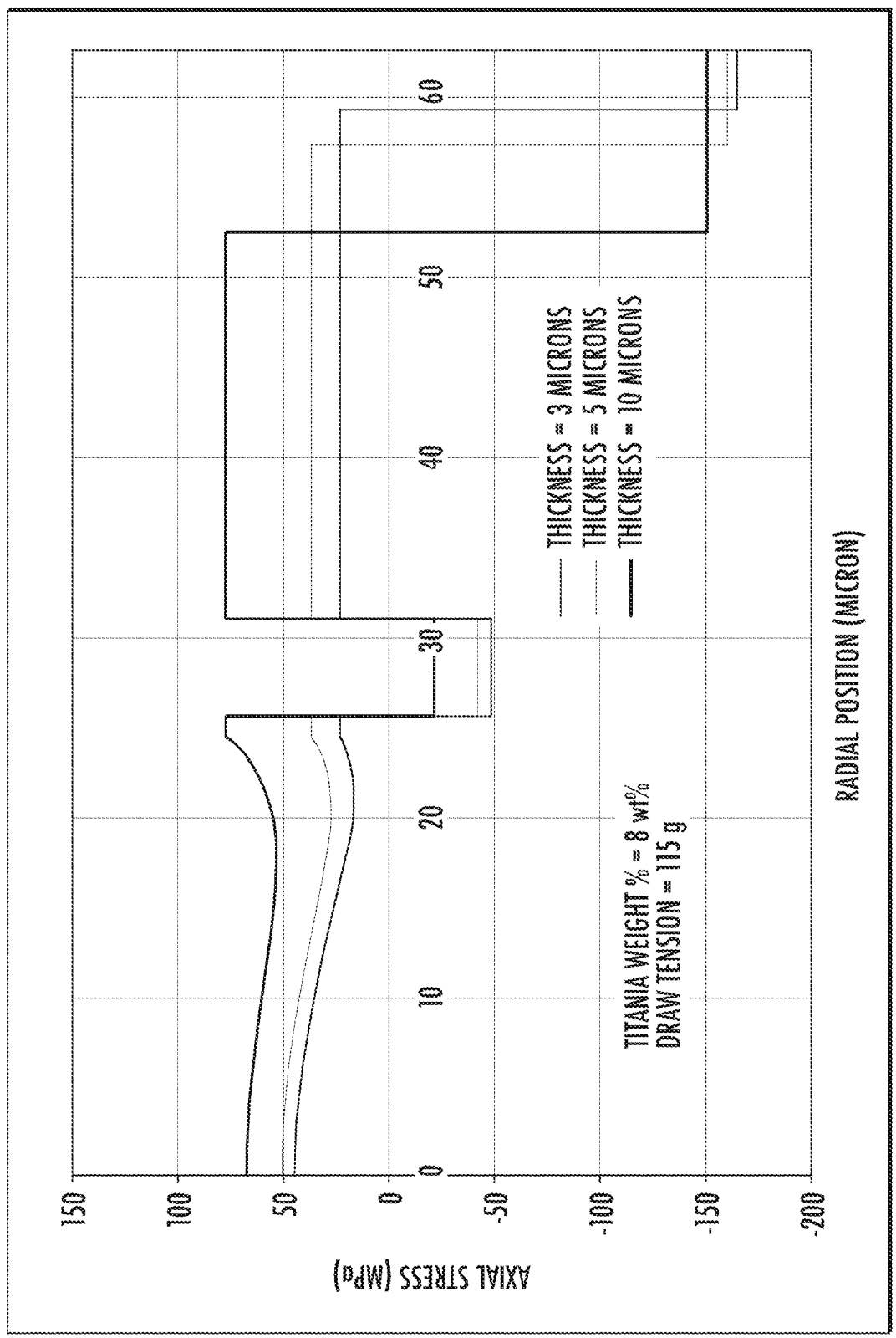
FIG. 16 is a graph illustrating the compressive axial stresses of multimode optical fibers having outer cladding layers with constant titania content and with varying titania thicknesses.

FIGS. 15 shows corresponding draw stresses for bend insensitive multimode optical fiber samples with outer cladding doped with different titania concentrations (with a constant titania-doped outer cladding thickness (3 microns) and draw tension (115 grams)). FIG. 16 shows the corresponding draw stresses for bend insensitive multimode optical fiber samples with different titania-doped outer cladding thicknesses (with a constant titania concentration of 8 wt. % based on the total weight composition of the titania-doped outer cladding) and draw tension (115 grams)), respectively. Similar to FIGS. 12-14, FIGS. 15 and 16 show that the optical fiber sample is under compression which provides advantageous benefits outlined above.

FIGS. 12-16 show that optical fiber samples exhibit surface compressive stress between 75 MPa and 300 MPa. In some embodiments, the optical fiber samples exhibit surface compressive stress between 100 MPa and 200 MPa.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. An optical fiber connector assembly, comprising:
   an optical fiber having an optical fiber diameter D1, the optical fiber comprising a core, an inner cladding surrounding the core, and a titania-doped outer cladding surrounding the inner cladding, the titania-doped outer cladding having between 4 wt. % to 16 wt. % titania based on the total weight of the titania-doped outer cladding and having a thickness between 3 microns and 20 microns;
   a ferrule having a front end, a rear end, and a ferrule bore including a ferrule bore diameter and extending between the front end and the rear end, wherein at least a portion of the ferrule bore defines a microhole that has a microhole diameter D2;
   wherein a fit D2-D1 exists between the microhole and the optical fiber, and the fit is between 0 microns and −0.4 microns;
   wherein the ferrule has a coefficient of thermal expansion sufficient to cause the microhole diameter D2 to expand when the ferrule is exposed to a heating temperature greater than 250° C.;
   wherein the ferrule further comprises a bonding agent positioned within the ferrule bore, the bonding agent having a viscosity less than 700 Pa.sec at the heating temperature.

2. The connector assembly of claim 1, wherein the optical fiber connector assembly has an insertion loss of less than 0.25 decibels (dB) at a reference wavelength of 1550 nanometers (nm).

3. The connector assembly of claim 1, wherein the optical fiber connector assembly has an insertion loss of less than 0.12 dB at a reference wavelength of 1550 nm.

4. The connector assembly of claim 1, wherein a position change of an end of the optical fiber relative to the front end of the ferrule before and after thermal cycling according to Telecordia standard GR-326, Issue 4, Sections 4.4.2.1 to 4.4.2.6, is less than 30 mm.

5. The connector assembly of claim 4, wherein the position change is less than 20 mm.

6. The connector assembly of claim 4, wherein the position change is less than 10 mm.

7. The connector assembly of claim 1, wherein the optical fiber has a maximum compressive stress in the titania-doped outer cladding between 75 MPa and 300 MPa.

8. The connector assembly of claim 1, wherein the optical fiber has a maximum compressive stress in the titania-doped outer cladding between 100 MPa and 250 MPa.

9. The connector assembly of claim 1, wherein the bonding agent has a viscosity of less than 500 Pa.sec at the heating temperature.

10. The connector assembly of claim 1, wherein the bonding agent has a viscosity of less than 300 Pa.sec at the heating temperature.

11. The connector assembly of claim 1, wherein the ferrule has a coefficient of thermal expansion sufficient to cause the microhole diameter D2 to expand when the ferrule is exposed to a heating temperature is greater than 400° C.

12. The connector assembly of claim 1, wherein the ferrule bore comprises a counterbore adjacent to the microhole.

13. The connector assembly of claim 1, wherein the fit secures the optical fiber within the microhole to withstand a pull-out force of at least 2 pounds-force (lbf).

14. A method of terminating an optical fiber with a ferrule; wherein the optical fiber comprises a core, an inner cladding surrounding the core, and a titania-doped outer cladding surrounding the inner cladding, the titania-doped outer cladding having between 4 wt. % to 16 wt. % titania based on the total weight of the titania-doped outer cladding and having a thickness between 3 microns and 20 microns, and wherein the optical fiber has an optical fiber diameter D1;
    the ferrule having a front end, a rear end, and a ferrule bore extending between the front end and the rear end, wherein at least a portion of the ferrule bore defines a microhole that has a microhole diameter D2, the method comprising:
    heating the ferrule such that the microhole diameter D2 expands to be greater than the optical fiber diameter D1;
    inserting the optical fiber into the microhole while the microhole diameter D2 is expanded; and
    cooling the ferrule such that the microhole diameter D2 contracts to be less than the optical fiber diameter D1, wherein D2-D1 is between 0 microns and −0.4 microns;
    wherein a bonding agent is injected into the ferrule bore during the heating the ferrule step.

15. The method of claim 14, wherein a speed of the inserting step is less than 10 millimeters per second (mm/sec).

16. The method of claim 15, wherein the speed of the inserting step is less than 5 mm/sec.

17. The method of claim 14, wherein heating the ferrule comprises heating the ferrule at a heating temperature greater than 250° C.

18. The method of claim 17, wherein the heating temperature is greater than 300° C.

19. The method of claim 14, wherein a bonding agent is preloaded into the ferrule bore and the heating the ferrule step melts the bonding agent.

20. The method of claim 14, wherein a bonding agent is injected into the ferrule bore before the heating the ferrule step.

21. A method of terminating an optical fiber with a ferrule;
wherein the optical fiber comprises a core, an inner cladding surrounding the core, and a titania-doped outer cladding surrounding the inner cladding, the titania-doped outer cladding having between 4 wt. % to 16 wt. % titania based on the total weight of the titania-doped outer cladding and having a thickness between 3 microns and 20 microns, and wherein the optical fiber has an optical fiber diameter $D1$;
the ferrule having a front end, a rear end, and a ferrule bore extending between the front end and the rear end, wherein at least a portion of the ferrule bore defines a microhole that has a microhole diameter $D2$, the method comprising:
heating the ferrule such that the microhole diameter $D2$ expands to be greater than the optical fiber diameter $D1$;
inserting the optical fiber into the microhole while the microhole diameter $D2$ is expanded; and
cooling the ferrule such that the microhole diameter $D2$ contracts to be less than the optical fiber diameter $D1$, wherein $D2-D1$ is between 0 microns and −0.4 microns;
wherein a bonding agent is injected into the ferrule bore before the heating the ferrule step.

* * * * *